United States Patent Office 3,851,050
Patented Nov. 26, 1974

3,851,050
RECOVERY OF SULFUR FROM SO₂-CONTAINING REGENERATION OFF-GASES
Willem Groenendaal, The Hague, Netherlands, Walter M. Lenz, Etobicoke, Ontario, Canada, and Philippus Loof, The Hague, Netherlands, assignors to Shell Oil Company, Houston, Tex.
Filed Sept. 6, 1973, Ser. No. 394,711
Claims priority, application Great Britain, Sept. 15, 1972, 42,920/72
Int. Cl. C01b 17/04
U.S. Cl. 423—574          11 Claims

ABSTRACT OF THE DISCLOSURE

A sulfur dioxide-rich off gas, for example, off-gas obtained in regenerating solid acceptors employed in the desulfurization of flue gases, is treated to recover the sulfur value contained therein by introducing the sulfur dioxide-rich off gas directly into the thermic reaction zone of a Claus sulfur recovery process under conditions such that a substantial portion of the sulfur dioxide reacts with the hydrogen sulfide to form elemental sulfur which is condensed from the effluent gases from the thermic reaction zone prior to their introduction into one or more catalytic conversion stages. The heat necessary to maintain the high temperature required in the thermic reaction zone, e.g., above 700° C., is advantageously supplied by combusting a hydrocarbonaceous fuel in the thermic reaction zone.

BACKGROUND OF THE INVENTION

The invention relates to an improved method for recovering sulfur from sulfur dioxide-containing off-gases such as those obtained when regenerating solid acceptors employed in the desulfurization of flue gases.

In the abatement of pollution of the atmosphere by industrial flue gases, an increasingly important objective is the removal of sulfur dioxide from such gases. A number of processes have been proposed for accomplishing this among which are those employing a solid acceptor for sulfur dioxide. By solid acceptor is meant a solid material which is capable of binding sulfur dioxide by adsorption or chemical reaction, thereby removing it from gas mixture so treated. Very useful acceptors are those which are capable of binding sulfur dioxide and/or sulfur trioxide as a sulfate at flue gas temperatures, e.g., 300–500° C., and subsequently releasing said oxides as sulfur dioxide upon regeneration a temperatures within the same range as acceptance. Suitable acceptors of this type comprise, for example, a metal or metal compound applied to a carrier material, e.g., copper oxide on alumina, which is employed in the process described in French Pat. No. 1,448,396.

A compound characteristic of most flue gas desulfurization processes is that the solid acceptor or other sorbent employed must be regenerated which results in the production of a sulfur dioxide-rich off-gas which is treated to recover the sulfur value contained therein. This is usually accomplished by conversion of the sulfur dioxide in the regeneration off-gas to sulfuric acid or elemental sulfur, the latter generally being accomplished in a Claus process as described below.

The recovery of elemental sulfur from hydrogen sulfide-containing gases by the Claus reaction is well known and various processes using this reaction are in commercial use. In general, the process involves carrying out the Claus reaction in a thermic reaction zone and one or more catalytic reaction zones, sulfur being recovered after each zone by cooling the gases and condensing the sulfur vapor formed. In the thermic reaction zone hydrogen sulfide is partially combusted in order to produce gases containing hydrogen sulfide and sulfur dioxide in the stoichiometric proportions required for the Claus reaction. On leaving the thermic reaction zone the gases are cooled and the majority of the sulfur vapor formed in the thermic reaction zone in condensed and recovered. The gases are then reheated and passed to one or more catalytic reaction zones in which additional sulfur vapor is formed and subsequently recovered by condensation.

In this type of Claus process, the stoichiometric amount of sulfur dioxide required for the Claus reaction has in the past either been completely or substantially completely provided by the partial combustion of hydrogen sulfide. In cases where a small amount of sulfur dioxide is provided from another source, the amount of sulfur dioxide so provided has not been enough to significantly reduce the yield of sulfur vapor formed in the thermic reaction zone.

Since the regeneration off-gas from a flue gas desulfurization process generally contains relatively large quantities of sulfur dioxide with little or no hydrogen sulfide, it is usually necessary to reduce or otherwise treat the regeneration off-gas to obtain the 2:1 ratio of hydrogen sulfide to sulfur dioxide required for the Claus reaction, unless, of course, hydrogen sulfide is available from an external source.

One method of treating regeneration off-gas from a flue gas desulfurization process is described in U.S. 3,726,958 to Holt et al. which involves reduction of the sulfur dioxide-rich off-gas stream with a hydrocarbon oil at a temperature of 250° F. to 800° F. to produce hydrogen sulfide, which is reacted with further amounts of sulfur dioxide to form elemental sulfur.

Another process for treating sulfur dioxide-rich regeneration off-gases is described in U.S. Ser. No. 224,103, filed Feb. 7, 1972 now Pat. No. 3,764,665. The disclosed process involves contacting the regeneration off-gas with a sulfur dioxide-selective liquid absorbent, passing the sulfur dioxide-rich absorbent liquid to a buffer zone and subsequently to a stripping zone where SO₂ is recovered and supplied at a substantially constant rate to a Claus sulfur recovery process. It is disclosed that the sulfur dioxide from the stripper may either be mixed with hydrogen sulfide from an external source, or if hydrogen sulfide is not available, it can be generated in the proper proportions for the Claus reaction by catalytically reducing two-thirds of the sulfur dioxide stream to hydrogen sulfide.

The present invention offers a still further and highly advantageous alternative for treating the sulfur dioxide-rich regeneration off-gas from a flue gas desulfurization process which permits the conversion of the sulfur dioxide to elementary sulfur in an existing Claus sulfur recovery plant in a highly efficacious manner with a minimum amount of equipment alteration.

SUMMARY OF THE INVENTION

It has now been found that the sulfur value of a sulfur dioxide-rich off-gas obtained in the regeneration of solid acceptors employed in the desulfurization of gas mixtures such as flue gas can be advantageously recovered by:

(a) Introducing said sulfur dioxide-rich regeneration off-gas into the thermic reaction zone of a Claus process in which zone hydrogen sulfide is partially combusted with an oxygen-containing gas to produce sulfur dioxide, the mole percentage of sulfur dioxide in the introduced regeneration off-gas to the sulfur dioxide produced by partial combustion being at least 25%;

(b) Maintaining the temperature in the thermic reaction zone at least 700° C. whereby hydrogen sulfide and sulfur dioxide react to form elemental sulfur;

(c) Withdrawing from the thermic reaction zone a gaseous effluent containing the formed sulfur and unreacted hydrogen sulfide and sulfur dioxide, and (d) Separating formed sulfur from the gaseous effluent and passing the gaseous effluent to a catalytic reaction zone wherein an additional amount of elemental sulfur is formed and subsequently recovered.

DESCRIPTION OF EMBODIMENTS

In practice of the invention, the sulfur dioxide-rich regeneration off-gas from a flue gas desulfurization process is introduced directly into the thermic reaction zone of a Claus process which is maintained at a critically high temperature by the addition of heat. As used herein, thermic reaction zone means a zone in which a hydrogen sulfide-containing gas is partially combusted to form a gaseous mixture of hydrogen sulfide and sulfur dioxide, the residence time of such mixture in such zone being sufficient for substantial amounts of sulfur, e.g., 50% or more of the sulfur present in the feed, to be formed according to the Claus reaction. The main reactions which take place in the thermic reaction zone of a Claus plant can be represented by the following equations:

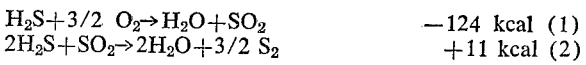
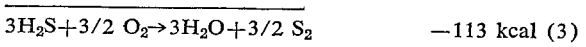

$$H_2S + 3/2\ O_2 \rightarrow H_2O + SO_2 \quad -124\ \text{kcal} \quad (1)$$
$$2H_2S + SO_2 \rightarrow 2H_2O + 3/2\ S_2 \quad +11\ \text{kcal} \quad (2)$$
$$3H_2S + 3/2\ O_2 \rightarrow 3H_2O + 3/2\ S_2 \quad -113\ \text{kcal} \quad (3)$$

The equilibrium state is finally determined by reaction (2) which is endothermic at high temperatures.

In order to obtain high yields of sulfur it is necessary to maintain a high temperature in the thermic reaction zone and at the same time allow the hydrogen sulfide and sulfur dioxide sufficient time to reach equilibrium according to equation (2). If these conditions are fulfilled then sulfur yields in the order of 70% of the sulfur present in the feed to the thermic reaction zone can be achieved.

According to the present invention, a sulfur dioxide-rich off-gas is introduced into the thermic reaction zone of a Claus process as hereinbefore described in an amount such that the mole percentage of sulfur dioxide so introduced to sulfur dioxide formed by the partial combustion of hydrogen sulfide is at least 25%. The introduction of such large amounts of sulfur dioxide-containing gas would normally have the effect of reducing the temperature of the gases in the thermic reaction to such a low level that substantially no sulfur formation according to equation (2) would occur. This would result because the addition of sulfur dioxide from an external source would decrease the amount of hydrogen sulfide which would have to be combusted to achieve the desired $H_2S$ to $SO_2$ ratio and correspondingly would decrease the temperature in the thermic reaction zone. Thus, an important aspect of the present invention entails the supply of additional heat to the thermic reaction zone to maintain a high temperature therein. In this way high yields of sulfur are achieved even though large amounts of sulfur dioxide are introduced to the thermic reaction zone.

In order to achieve high yields of sulfur in the thermic reaction zone, the amount of additional heat supplied is preferably such that a temperature of at least 700° C. is maintained in the thermic reaction zone. More preferably, sufficient additional heat is supplied such that the temperature in the thermic reaction zone lies between 900° C. and 1400° C.

The supply of heat to the thermic reaction zone can be achieved in a number of different ways. For example, it is possible to heat the sulfur dioxide-containing gas to a high temperature before passing it to the thermic reaction zone. Alternatively, the hydrogen sulfide-containing gas or the oxygen-containing gas may be heated before passing to the thermic reaction zone. Variations on this theme in which two of the three gases, or all of the three gases are pre-heated before passing to the thermic reaction zone may also be employed. However, these methods of supplying heat are somewhat disadvantageous in that some form of heating equipment is required to heat the gas supply lines and this can be rather expensive. Another method of supplying heat is to combust fuel via a line burner in the sulfur dioxide-containing gas supply line so that the gases are hot when introduced to the thermic reaction zone. However, this method also suffers from the disadvantage that relatively expensive equipment, i.e., a line burner, is required to generate the necessary heat.

A very advantageous method for supplying heat to the thermic reaction zone and one which is preferred according to the present invention, entails combusting a fuel within the thermic reaction zone per se. This has the advantage of requiring no additional heating equipment and is therefore highly economic. In practice, the amount of oxygen-containing gas which is introduced to the thermic reaction zone is regulated so that it is sufficient for the complete combustion of the fuel and for the combustion of the required amount of hydrogen sulfide.

The complete combustion of all the fuel which is introduced to the thermic reaction zone is required in order to prevent the formation of soot which would result in the discoloration of the recovered sulfur and fouling of the catalyst in the catalytic reaction zone(s).

The amount of hydrogen sulfide which must be combusted in the thermic reaction zone, and therefore the amount of oxygen required to be introduced, depends on the type of fuel used and the amount of sulfur dioxide which is introduced from the external source. Advantageously the aggregate amount of sulfur dioxide formed by combustion of hydrogen sulfide and that introduced from an external source should be such that the mole ratio of hydrogen sulfide to sulfur dioxide in the gases in the thermic reaction zone is substantially 2:1 (i.e., the stoichiometric amounts for the reaction according to equation (2)). In this way high yields of sulfur can be achieved in the thermic reaction zone.

Although the supply of oxygen-containing gas to the thermic reaction zone is usually regulated such that the mole ratio of hydrogen sulfide to sulfur dioxide in the gases in the thermic reaction zone is substantially 2:1, this is not essential. If, for example, it is decided that either part of the hydrogen sulfide-containing gas or part of the sulfur dioxide-containing gas or both should by-pass the thermic reaction zone and pass directly to the catalytic reaction zone, the mole ratio of hydrogen sulfide to sulfur dioxide in the gases leaving the thermic reaction zone may vary substantially from 2:1 in order that the mole ratio of hydrogen sulfide to sulfur dioxide in the gases passing to the catalytic reaction zone (i.e., the gases from the thermic reaction zone plus the by-pass gases) should be substantially 2:1. The yield of sulfur formed in the thermic reaction zone is reduced if such a by-pass is employed, but if the amount of by-pass is small the effect on the overall sulfur recovery in the process is not significant.

The fuel may be introduced into the thermic reaction zone separately from the other gases. In this case it is advantageous to introduce the fuel directly behind or in the immediate vicinity of the flame formed by the partial combustion of the hydrogen sulfide-containing gas. This is not essential however and introduction of the fuel may be made in any part or parts of the thermic reaction zone. The fuel may also be introduced into the thermic reaction zone as a mixture with one or more of the other gases. Accordingly, it may be mixed with the sulfur dioxide-containing gas or even with the oxygen-containing gas before passing to the thermic reaction zone. It is particularly preferred however to introduce the fuel into the thermic reaction zone as a mixture with the hydrogen sulfide-containing gas. This has the advantage that the flame formed by combustion of the gaseous mixture is very hot and remains stable even in the presence of large amounts of sulfur dioxide.

The amount of fuel which is introduced to the thermic reaction zone depends, inter alia, on the amount of sulfur dioxide-containing gas which is introduced thereto, the temperature at which it is desired to operate and the type of fuel used. In general, however, the amount of fuel is not greater than 25% mole of the hydrogen sulfide content of the hydrogen sulfide-containing gas introduced to the thermic reaction zone. Preferably the amount of fuel introduced to the thermic reaction zone lies between 1% mole and 10% mole of the hydrogen sulfide content of the hydrogen sulfide-containing gas introduced to the thermic reaction zone.

Any suitable fuel may be combusted in the thermic reaction zone. Generally hydrocarbonaceous fuels will be employed and such fuels may be in the form of a gas, a liquid or a solid. A liquid fuel should be combusted in an atomizer and a solid fuel should be finely pulverized before combustion in order to ensure that complete combustion occurs. A gaseous fuel is preferred, however, in view of ease of handling and the fact that special burner equipment is not required. A particularly preferred fuel is a hydrocarbon gas having a substantially constant composition, since the control of the temperature within the thermic reaction zone is then facilitated. The reason for this is that if a gas is used whose composition continually varies during operation of the process, the heating value of the gases also varies and renders control of the temperature more difficult. Accordingly methane, ethane, propane, butane, pentane or a mixture thereof in fixed proportions may be advantageously employed.

The sulfur dioxide-rich off-gas may be introduced into the thermic reaction zone separately or as a mixture with the hydrogen sulfide-containing gas or the oxygen-containing gas. Whichever method is used, however, the important considerations to bear in mind are that the flame formed by the partial combustion of the hydrogen sulfide-containing gas should not become unstable and the temperature of the flame should not become too low. The latter point is of added importance when the fuel is introduced to the thermic reaction zone as a mixture with the hydrogen sulfide-containing gas because if the flame temperature is too low, the fuel is not completely combusted and soot formation occurs.

According to a particularly preferred embodiment of the present invention, the introduction of the sulfur dioxide-containing gas into the thermic zone is effected by distributing it around the gas flame formed by the partial combustion of the hydrogen sulfide-containing gas. This is advantageous because the flame remains stable and the temperature of the flame does not decrease to low levels. The distribution of the sulfur dioxide-containing gas around the gas flame may be effected by any suitable means. Preferably however a ring distributor with nozzles is used for this purpose.

As previously mentioned, the present invention is particularly suitable for the recovery of sulfur from sulfur dioxide-containing gas obtained in the desulfurization of flue gases using solid acceptors. One of the processes proposed to achieve this recovers sulfur dioxide as a sulfur dioxide-rich gas comprising about 90% by volume of sulfur dioxide, the remainder being water. The present process is particularly well suited to treat such a gas. Obviously, however, the present invention would also be suitable for the treatment of sulfur dioxide-rich gas streams obtained when regenerating other types of sorbents for sulfur dioxide including those obtained in the regeneration of liquid sorbents.

In practice, the amount of sulfur dioxide-containing gas introduced into the thermic reaction zone in relation to the amount of hydrogen sulfide-containing gas so introduced is limited. Accordingly, the relative amount of sulfur dioxide-containing gas should not be so small that the temperature within the thermic reaction zone is not significantly reduced because in such a case the supply of additional heat to the thermic reaction zone would not then be necessary. On the other hand it is not normally so high that no partial combustion of hydrogen sulfide is necessary in order to provide sulfur dioxide for sulfur recovery. In general therefore the mole ratio of hydrogen sulfide to sulfur dioxide in the gases introduced to the thermic reaction zone lies between 10:1 and 2:1. Preferably it lies between 5:1 and 3:1.

In cases where the mole ratio of hydrogen sulfide to sulfur dioxide in the gases introduced into the thermic reaction zone is lower than 2:1, the fuel can be partially combusted in order to provide hydrogen for reducing a certain amount of the sulfur dioxide and to achieve stoichiometric proportions of hydrogen sulfide to sulfur dioxide for sulfur recovery. In such cases the fuel not only acts to provide heat, but also to provide hydrogen for reducing sulfur dioxide.

The invention also relates to an apparatus suitable for carrying out the process described hereinbefore. This apparatus comprises:

(a) A closed reactor having (1) inlets for the introduction of a hydrogen sulfide-containing gas, a sulfur dioxide-containing gas, an oxygen-containing gas and fuel, and an outlet for withdrawing a gaseous effluent, (2) means for partially combusting the hydrogen sulfide-containing gas with the oxygen-containing gas to produce sulfur dioxide, (3) means for combusting the fuel with the oxygen-containing gas to maintain a high temperature in the reactor, and means for distributing the introduced sulfur dioxide-containing gas around the flame formed by the partial combustion of the hydrogen sulfide-containing gas whereby a gaseous effluent containing elemental sulfur and unreacted hydrogen sulfide and sulfur dioxide is obtained;

(b) A condenser for separating elemental sulfur from said gaseous effluent; and (c) A catalytic reactor through which the gaseous effluent from the condenser is passed to convert further amounts of hydrogen sulfide and sulfur dioxide to elemental sulfur.

In a particularly preferred embodiment of the invention, the means for distributing the sulfur dioxide-containing gas is a ring distributor with nozzles so positioned that the gas is distributed around the flame formed by the partial combustion of the hydrogen sulfide-containing gas. Any suitable burner may be used for combusting hydrogen sulfide and fuel. In particular, a high-intensity whirl chamber burner is very suitable.

A method in which the process and apparatus according to the present invention are suitably used for the recovery of sulfur from hydrogen sulfide and sulfur dioxide is described below with reference to the accompanying drawings. For the sake of simplicity, accessories such as valves, pumps, control instruments and the like are not shown in the drawings.

Figure 1:
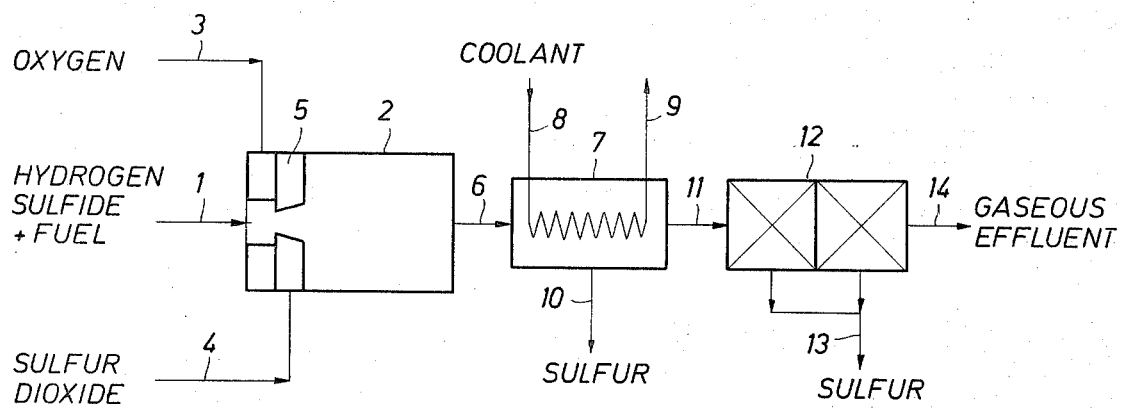
FIG. 1 is a diagrammatic representation of a process for the recovery of elemental sulfur from hydrogen sulfide and sulfur dioxide.

With regard to FIG. 1, a mixture of a hydrogen sulfide-rich gas and a gaseous fuel is passed via line 1 to a closed reactor 2 in which the mixture is combusted. Oxygen-containing gas is passed to reactor 2 via line 3, and sulfur dioxide-containing gas is introduced into reactor 2 via line 4 and a ring distributor 5. Ring distributor 5 serves to evenly distribute the sulfur dioxide-containing gas around the flame formed by combustion of the hydrogen sulfide-containing gas and the gaseous fuel. The hot gases are passed out of the reactor 2 via line 6 into a heat exchanger 7. Coolant is passed into heat exchanger 7 via line 8 and discharged via line 9. Sulfur is condensed out of the gases in heat exchanger 7 and is recovered via line 10. The cooled gases are then heated and passed via line 11 through two catalytic reactors 12 in series. After passing through the first catalytic reactor the gases are cooled in a cooler (not shown) in order to condense out the sulfur formed, and then reheated before passing to the second reactor. After passing out of the second reactor the gases are again cooled in a condenser (not shown) in order to condense out sulfur. Sulfur is recovered via line 13. The effluent gases from the catalytic reactors are passed via line 14 to an incinerator (not shown) before being discharged to the atmosphere.

Figure 2:
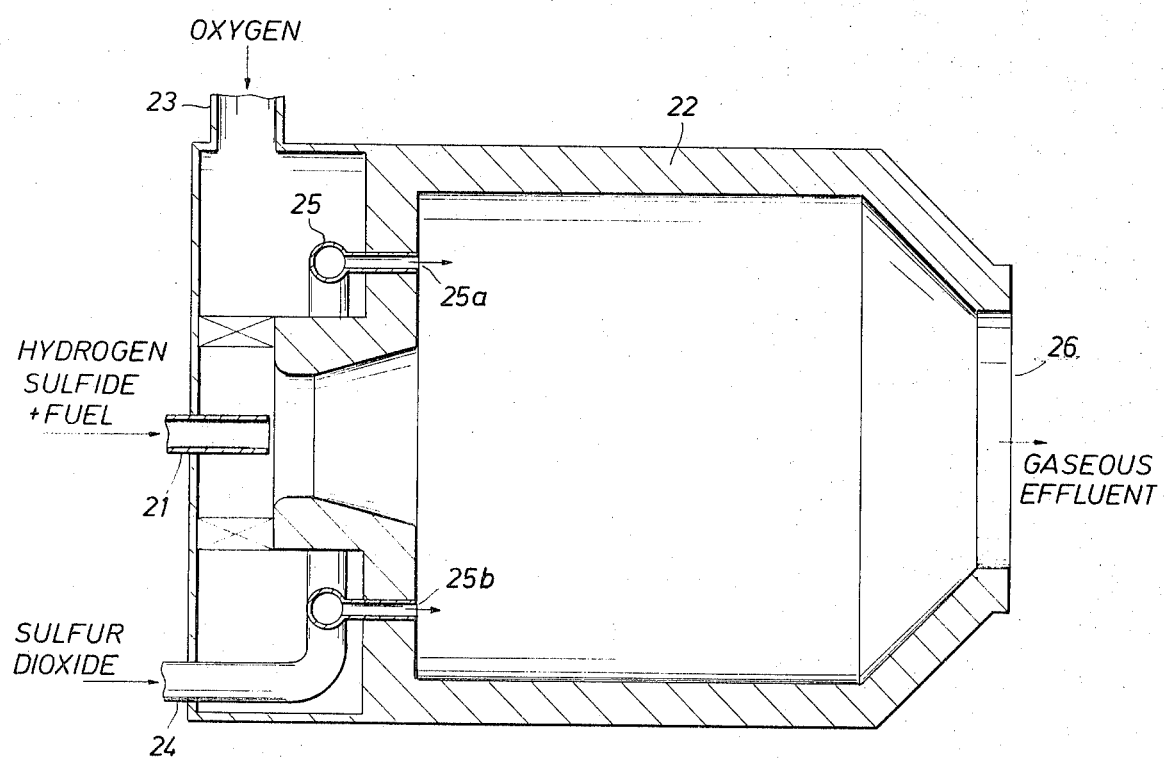
FIGS. 2, 3 and 4 are diagrammatic representations of three possible types of reactors which may be used in the process according to the present invention.
Figure 3:
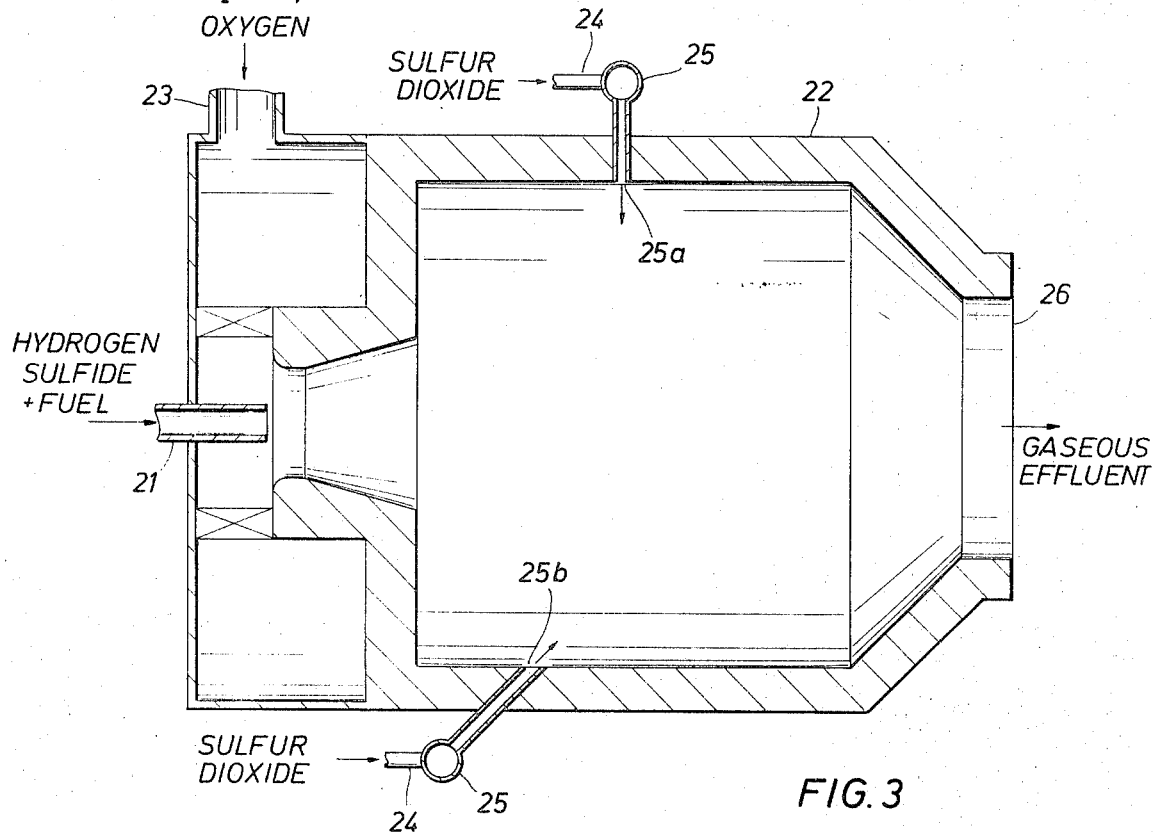
Figure 4:
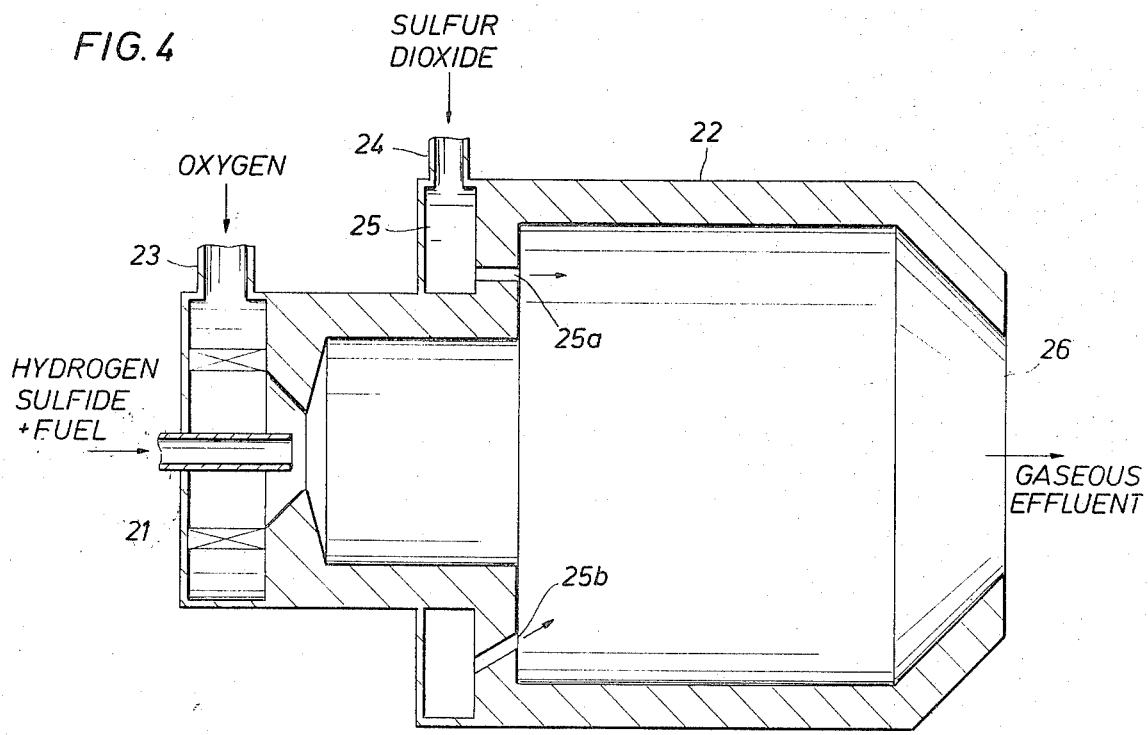

In FIGS. 2, 3 and 4, equivalent parts of the three reactors depicted are numbered with the same reference numerals. Thus, number 21 in said figures refers to the hydrogen sulfide and fuel inlet to the reactor, 22 to the refractory lining of the reactor, 23 to the oxygen-containing gas inlet to the reactor and 24 to the sulfur dioxide-containing gas inlet to the reactor. Numeral 25 refers to the distribution means used for distributing the sulfur dioxide-rich gas to the reactor, while 25a and 25b refer to the nozzles of the distribution means, and 26 to the reactor outlet.

FIG. 2 depicts a conventional burner in which the distribution means for sulfur dioxide-containing gas is a ring distributor housed within the oxygen-containing gas inlet compartment. The sulfur dioxide-containing gas is introduced by the nozzles around the flame formed by the burning hydrogen sulfide and fuel.

In FIG. 3, the sulfur dioxide-containing gas is introduced into the reactor via nozzles situated towards the middle of the reactor. These nozzles may be perpendicular to the reactor walls as in noozle 25a or at an angle to them as in nozzle 25b.

FIG. 4 depicts a reactor incorporating a high intensity whirl chamber burner. The sulfur dioxide-containing gas is introduced via a simple distribution chamber 25 through nozzles which may either be perpendicular to the reactor walls as in nozzle 25a or at an angle to them as in nozzle 25b.

The following Example will further elucidate the invention.

EXAMPLE

A mixture of a hydrogen sulfide-containing gas and butane/pentane is combusted at atmospheric pressure in a main reactor. The hydrogen sulfide-containing gas has a hydrogen sulfide content of 88.0% mole and the amount of butane/pentane which is mixed with the hydrogen sulfide-containing gas is 4.6% mole. The feed rate of the mixture to the main reactor is 27.2 cubic meters per minute.

Air is introduced to the main reactor at a rate of 69.5 cubic meters per minute and a sulfur dioxide-containing gas having a sulfur dioxide content of 91.5% mole is introduced to the main reactor via a ring distributor at a rate of 4.8 cubic meters per minute.

The average temperature of the gases within the main reactor is 1255° C. and the residence time of the gases within the main reactor is 0.5 second. The mole ratio of hydrogen sulfide to sulfur dioxide in the gases is substantially 2:1.

The gases are passed from the main reactor to a heat exchanger in which they are cooled to a temperature of 205° C. Sulfur is condensed out of the gases at the rate of 24.5 kilograms per minute. The percentage of sulfur recovered to total sulfur content of the feed streams to the main reactor is 63.0%.

The gases are then passed to two catalytic reactors in series. Before passing to each reactor they are heated to 250/220° C. and after passing out of each catalytic reactor they are cooled to 150/140° C. in order to condense out sulfur. The catalyst employed is activated natural bauxite.

The total sulfur condensed out of the gases form the two catalytic reactors is 12.0 kilograms per minute. The percentage of sulfur recovered in the catalytic reactors to total sulfur content of the feed streams to the main reactor is 30.9%.

The effluent gases from the last catayltic reactor contain 0.8% mole of hydrogen sulfide and 0.4% mole of sulfur dioxide. These gases are incinerated to give a gas having a hydrogen sulfide content of less than 20 p.p.m. which is discharged to the atmosphere.

It can be seen from this Example that the total amount of sulfur recovered is 93.9% of the sulfur present in the feed streams to the main reactor, 63.0% of the sulfur being recovered in the heat exchanger and 30.9% being recovered from the gases leaving the catalytic reactors.

What is claimed is:

1. In a process for the removal of sulfur dioxide from gas mixtures with a solid acceptor for sulfur dioxide wherein the solid acceptor is regenerated with the production of a regeneration off-gas rich in sulfur dioxide, the improvement which comprises recovering the sulfur value from said regeneration off-gas by:

(a) introducing said sulfur dioxide-containing regeneration off-gas into the thermic reaction zone of a Claus process in which zone hydrogen sulfide is partially combusted with an oxygen-containing gas to produce sulfur dioxide, the mole percentage of sulfur dioxide in the introduced regeneration off-gas to the sulfur dioxide produced by partial combustion being at least 25%;
   (b) maintaining the temperature in the thermic reaction zone at least 700° C. whereby hydrogen sulfide and sulfur dioxide react to form elemental sulfur;
   (c) withdrawing from said thermic reaction zone a gaseous effluent containing the formed sulfur and unreacted hydrogen sulfide and sulfur dioxide, and
   (d) separating formed sulfur from the gaseous effluent and passing the gaseous effluent to a catalytic reaction zone wherein an additional amount of elemental sulfur is formed and subsequently recovered.

2. The process of claim 1 wherein a temperature between 900° C. and 1400° C. is maintained in the thermic reaction zone.

3. The process of claim 2 wherein heat is supplied to the thermic reaction zone, in order to maintain the temperature in the thermic reaction zone, by combusting a hydrocarbonaceous fuel therein, the amount of oxygen-containing gas which is introduced to the said zone being regulated such that it is sufficient for the complete combustion of the fuel and for the combustion of the required amount of hydrogen sulfide.

4. The process of claim 3 wherein the amount of fuel introduced to the thermic reaction zone is not greater than 25% mole of the hydrogen sulfide content of the hydrogen sulfide-containing gas introduced to the thermic reaction zone.

5. The process of claim 4 wherein the mole ratio of hydrogen sulfide to sulfur dioxide in the gases introduced to the thermic reaction zone lies between 10:1 and 2:1.

6. The process of claim 5 wherein the amount of fuel introduced to the thermic reaction zone lies between 1% mole and 10% mole of the hydrogen sulfide content of the hydrogen sulfide-containing gas introduced to the thermic reaction zone.

7. The process of claim 6 wherein the mole ratio of hydrogen sulfide to sulfur dioxide in the gases introduced to the thermic reaction zone lies between 5:1 and 3:1.

8. The process of claim 7 wherein the fuel is a hydrocarbon gas having a substantially constant composition.

9. The process of claim 8 wherein the fuel is introduced to the thermic reaction zone as a mixture with the hydrogen sulfide-containing gas.

10. The process of claim 9 wherein the fuel is methane, ethane, propane, butane, pentane or a mixture thereof.

11. The process of claim 10 wherein the introduction of the sulfur dioxide-containing gas into the thermic zone is effected by distributing it around the gas flame formed by the partial combustion of the hydrogen sulfide-containing gas in the thermic reaction zone.

References Cited

UNITED STATES PATENTS

| | | | |
|---|---|---|---|
| 3,764,665 | 10/1973 | Groenendaal et al. | 423—574 |
| 3,297,409 | 1/1967 | Kunkel et al. | 423—574 |

JOHN H. MACK, Primary Examiner

W. I. SOLOMON, Assistant Examiner

U.S. Cl. X.R.

423—222, 244